United States Patent [19]

Jameson

[11] Patent Number: 5,238,633

[45] Date of Patent: Aug. 24, 1993

[54] METHOD AND APPARATUS FOR RECYCLING PLASTIC WASTE INTO A THIN PROFILE, MECHANICALLY REINFORCED BOARD

[75] Inventor: Gary L. Jameson, Brookhaven, Pa.

[73] Assignee: Duraplast Corporation, Upland, Pa.

[21] Appl. No.: 705,446

[22] Filed: May 24, 1991

[51] Int. Cl.⁵ ................... B29C 47/02; B29C 47/50
[52] U.S. Cl. ................... 264/211.23; 264/349; 264/DIG. 69; 425/114; 425/205; 425/377
[58] Field of Search ............. 264/174, 349, 211.23, 264/113, 37, DIG. 69; 425/202, 203, 205, 208, 114, 377; 428/304.4, 297, 298

[56] References Cited

U.S. PATENT DOCUMENTS

| | | | |
|---|---|---|---|
| Re. 32,772 | 10/1988 | Hawley | 264/108 |
| 244,557 | 7/1881 | Crawford | |
| 1,312,424 | 8/1919 | Richardson | |
| 1,514,561 | 11/1924 | Morreale | |
| 1,659,638 | 2/1928 | Hinde | |
| 1,791,856 | 5/1926 | Van Dusen | |
| 2,091,125 | 8/1937 | Stewart | 25/17 |
| 2,655,710 | 10/1953 | Roenshch | |
| 2,702,410 | 2/1955 | Brown | 18/48 |
| 2,728,698 | 12/1955 | Rudner | |
| 2,847,733 | 8/1958 | Roy | |
| 2,997,968 | 8/1961 | Fitzpatrick et al. | 107/14 |
| 3,060,512 | 10/1962 | Martin et al. | 18/48 |
| 3,388,196 | 6/1968 | Farrell | 264/75 |
| 3,457,880 | 7/1969 | Eppenberger | 107/14 |
| 3,487,503 | 1/1970 | Barr et al. | 18/12 |
| 3,518,721 | 7/1970 | Rukas et al. | 425/202 |

(List continued on next page.)

FOREIGN PATENT DOCUMENTS

| | | | |
|---|---|---|---|
| 0051880 | 5/1982 | European Pat. Off. | |
| 0416859 | 3/1991 | European Pat. Off. | |
| 55-159951 | 12/1980 | Japan | 425/376.1 |
| 61-211013 | 9/1986 | Japan | 425/376.1 |
| 1552234 | 9/1979 | United Kingdom | 264/37 |

OTHER PUBLICATIONS

Patent Abstracts of Japan, vol. 13, No. 234, M932, abstract of JP 01-45620 (1989).
Advanced Recycling Technology SA, "The Recycling Process E.T.1".
Advanced Recycling Technology Ltd., "The ET/1 System".
Thermoplastic Pultrusions, Inc., "VyBron Pultruded Rods, Bars, Profiles", 1991.

*Primary Examiner*—Jeffery Thurlow
*Attorney, Agent, or Firm*—Seidel, Gonda, Lavorgna & Monaco

[57] ABSTRACT

The present invention relates to a method and apparatus for forming an extruded plastic lumbar product from a commingled plastic waste feed stock. The apparatus generally includes an extruder portion and a forming portion. The extruder portion includes a compound extruder which compresses and melts the waste product by a sudden transition within a constant pitch conveyor. From the compound extruder, the melt is introduced into a hot melt extruder which is formed so as to prevent vortex of the melt or mixing of the different resins. The hot melt conveyor includes a diminishing pitch along its length and a short transition section and metering section. The hot melt is then formed into a desired profile through a cross-head die in which a series of rovings are introduced into the melt. The rovings serve as a reinforcement for the extruded product as well as define the extruded profile feed rate. Because of commingled blend of dissimilar resins in the feed material, there are often inconsistencies in the melt strength. The rovings compensate for these inconsistencies and provide an extruded product having the desired strength and stiffness characteristics.

23 Claims, 8 Drawing Sheets

U.S. PATENT DOCUMENTS

| | | | |
|---|---|---|---|
| 3,712,776 | 1/1973 | Woodham | 425/202 |
| 3,746,489 | 7/1973 | Rizzi et al. | 425/205 |
| 3,762,693 | 10/1973 | DeBoo et al. | 259/191 |
| 3,832,431 | 8/1974 | Matthaei | 264/75 |
| 3,860,220 | 1/1975 | Matsubayashi et al. | 259/192 |
| 3,947,169 | 3/1976 | Wolff et al. | 425/71 |
| 3,947,537 | 3/1976 | Buntin et al. | 264/137 |
| 3,954,356 | 5/1976 | Winchell et al. | 418/83 |
| 3,991,153 | 11/1976 | Klausner et al. | 264/211 |
| 4,015,039 | 3/1977 | Segal et al. | 264/136 |
| 4,022,864 | 5/1977 | Medler . | |
| 4,025,256 | 5/1977 | Heller | 425/114 |
| 4,029,728 | 6/1977 | Sharp et al. . | |
| 4,067,826 | 1/1978 | Emery | 264/37 |
| 4,091,153 | 5/1978 | Holman . | |
| 4,107,260 | 8/1978 | Dougherty | 264/349 |
| 4,121,957 | 10/1978 | Allen | 156/79 |
| 4,127,636 | 11/1978 | Flanders . | |
| 4,134,714 | 1/1979 | Driskill | 425/203 |
| 4,135,870 | 1/1979 | Wallace et al. | 425/130 |
| 4,141,929 | 2/1979 | Stoops et al. . | |
| 4,155,655 | 5/1979 | Chiselko et al. . | |
| 4,173,417 | 11/1979 | Kruder | 366/89 |
| 4,184,772 | 1/1980 | Meyer | 366/77 |
| 4,185,060 | 1/1980 | Ladney, Jr. | 264/54 |
| 4,187,352 | 2/1980 | Klobbie | 521/79 |
| 4,248,452 | 8/1981 | Bethge . | |
| 4,250,132 | 2/1981 | Beach | 264/68 |
| 4,277,182 | 7/1981 | Kruder | 366/89 |
| 4,285,600 | 8/1981 | Kruder | 366/89 |
| 4,300,840 | 11/1981 | Kishihiro | 366/88 |
| 4,309,114 | 1/1982 | Klein et al. | 366/79 |
| 4,322,202 | 3/1982 | Martinez | 425/208 |
| 4,373,434 | 2/1983 | Alexander et al. | 100/43 |
| 4,410,474 | 10/1983 | Ahrweiler . | |
| 4,416,543 | 11/1983 | Brinkmann | 366/80 |
| 4,419,261 | 12/1983 | Takahashi | 252/182 |
| 4,430,373 | 2/1983 | Hammarberg . | |
| 4,439,387 | 3/1984 | Hawley | 264/136 |
| 4,609,513 | 9/1986 | Israel | 264/122 |
| 4,616,989 | 10/1986 | Mewes et al. | 425/203 |
| 4,626,189 | 12/1986 | Hammer et al. | 425/146 |
| 4,645,631 | 2/1987 | Hegenstaller et al. | 264/113 |
| 4,738,808 | 4/1988 | Hammer et al. | 264/40.1 |
| 4,746,478 | 5/1988 | Fujisaki et al. | 264/53 |
| 4,797,237 | 1/1989 | Hammer et al. | 264/45.3 |
| 4,812,343 | 3/1989 | Kiekhaefer et al. | 264/136 |
| 4,824,627 | 4/1989 | Hammer et al. | 264/211.21 |
| 4,839,120 | 6/1989 | Baba et al. | 264/102 |
| 4,859,166 | 8/1989 | Hamada et al. | 425/204 |
| 4,863,366 | 9/1989 | Kim | 425/376.1 |
| 4,867,665 | 9/1989 | Wada | 425/145 |
| 4,897,233 | 1/1990 | Bier et al. | 264/349 |
| 4,921,656 | 5/1990 | Daumit et al. | 264/85 |
| 4,937,028 | 6/1990 | Glemet et al. | 264/136 |
| 4,937,034 | 6/1990 | Sewell | 264/349 |
| 4,960,549 | 10/1990 | Brooks et al. | 264/45.5 |
| 5,088,910 | 2/1992 | Goforth et al. | 264/DIG. 69 |
| 5,092,950 | 3/1992 | Spoo et al. | 425/114 |
| 5,096,645 | 3/1992 | Fink | 264/174 |
| 5,112,206 | 5/1992 | Stewart | 425/114 |

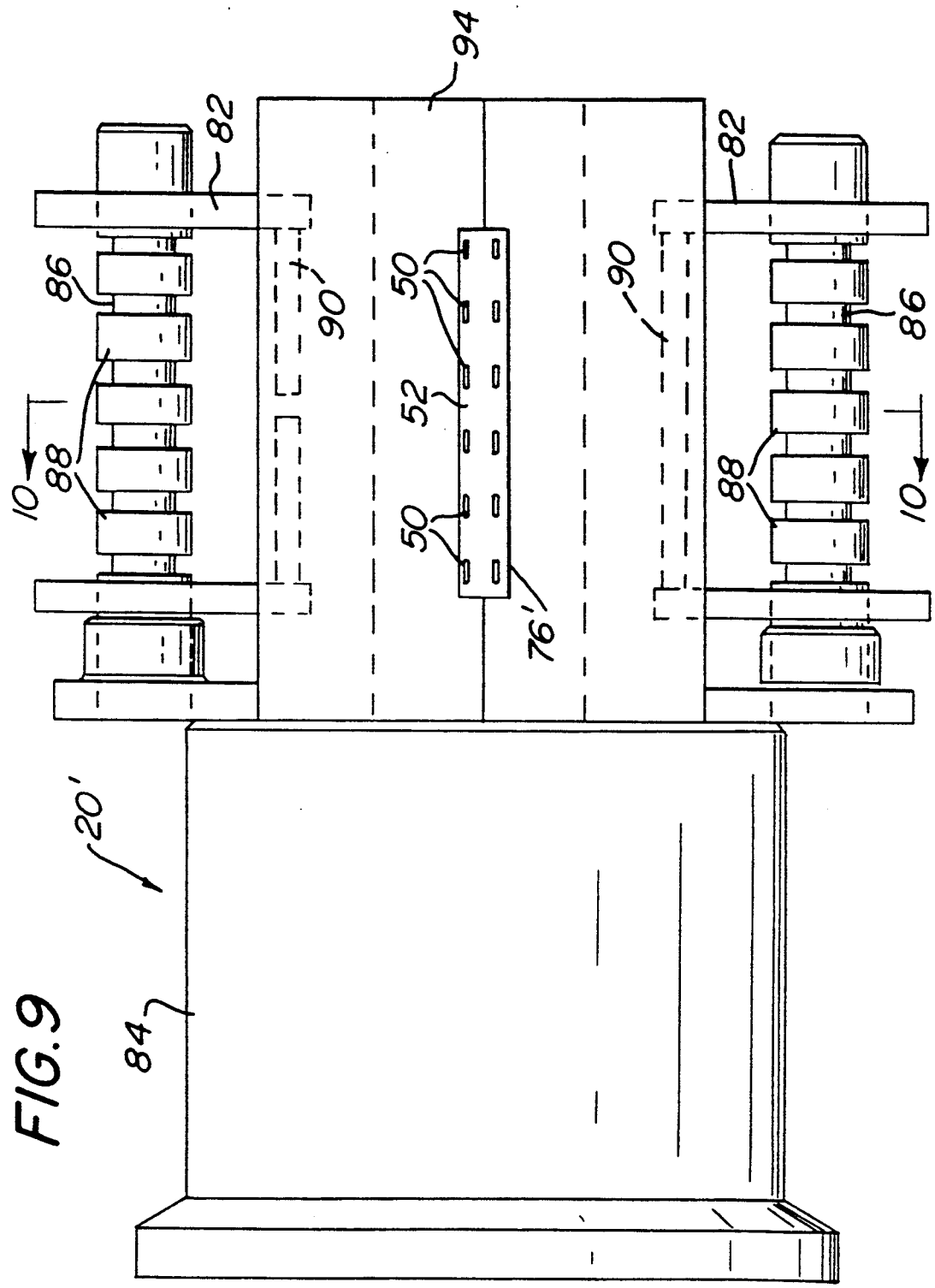

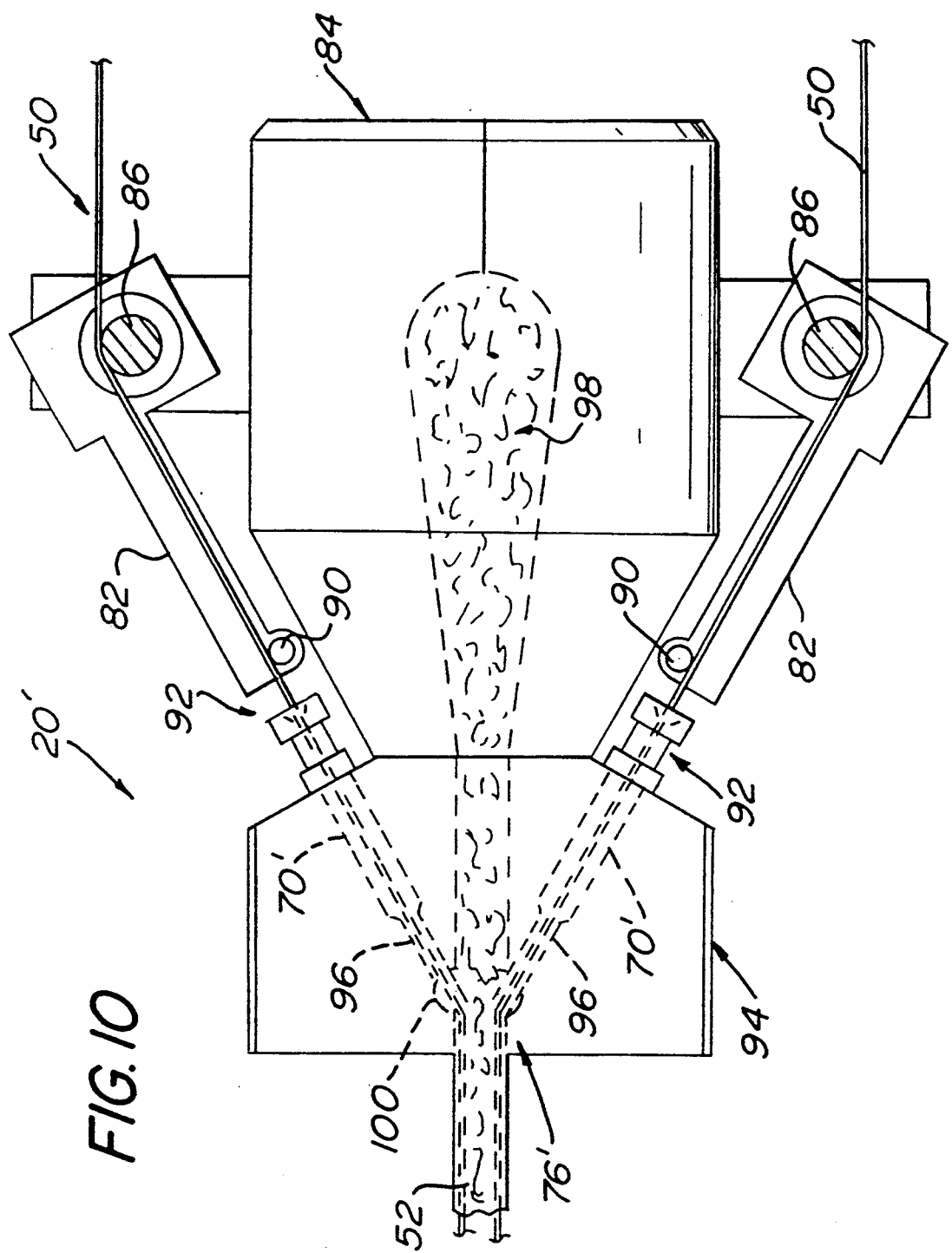

METHOD AND APPARATUS FOR RECYCLING PLASTIC WASTE INTO A THIN PROFILE, MECHANICALLY REINFORCED BOARD

FIELD OF THE INVENTION

The present invention generally relates to the melting and extrusion of a plastic feed material and the formation of plastic articles. More particularly, the present invention relates to a method and apparatus for melting, extruding and forming 100% mixed, contaminated, post-consumer and/or industrial plastic waste. More particularly, the present invention relates to a method and apparatus for recycling plastic waste into a thin profile (i.e., in the range of 0.250 inch to one (1) inch), mechanically reinforced board, rod, shape or other products for commercial or consumer use.

BACKGROUND OF THE INVENTION

Prior processes for extrusion of recycled plastic for purposes of molding certain articles have been limited by the fact that the feed stock must be subjected to significant and costly pre-process steps. Also, the commercial viability of these processes has been limited by the size and physical properties of the resulting article. For example, in the production of plastic lumber, the profiles are limited to thicknesses of greater than one inch, the lengths are restricted to standard mold sizes and a maximum of 14 feet, the tensile strength and stiffness are sufficient for only light loads and short spans, residual moisture cannot be devolatized without drying equipment, post-melt additives cannot be introduced, mechanical reinforcement agents such as continuous inorganic fiber rovings cannot be introduced, and the production volume is low thus substantially increasing unit cost. Systems that use recycled plastic typically will not accommodate commingled, contaminated feed stock and often require resins to be segregated and the feed stock to be washed. Moreover, because these systems do not allow for mechanical reinforcement, the lumber they produce has insufficient tensile strength for use in critical load-bearing applications.

In a number of industrial applications, such as the production of pallets for use in warehouses, the nominal dimension of the decking boards or slats are typically 1"×4" or 1"×6". Other applications also require a thin profile board so as to limit the weight and size of the overall product as well as the amount of material being used. In commingled, contaminated feed stock, such thin profiles have not been possible due to the mixture of dissimilar resins introduced with the feed stock. Each resin has a different melting temperature, melt index, and melt strength, among other characteristics, which creates limitations in the final extrusion of the product. Moreover, in order to maintain sufficient stiffness of the final product, it has often been required to increase the thickness of the product as well as limit its overall length or span.

BRIEF SUMMARY OF THE INVENTION

The present invention relates to a method and apparatus for producing a thin profile, mechanically reinforced board or the like from a recycled plastic waste material such as a commingled, contaminated feed stock having dissimilar resins therein. For purposes of the present invention, the term "thin profile" is being defined to describe extrusion thicknesses of approximately two (2) inches or less. However, relatively thicker profiles are possible.

The process of the invention requires that the plastic waste be size reduced, such as by a shredder, granulator or densifier or the like, so as to produce a particulate structure. The particulate is then introduced into a first extruder having a constant pitch. Within this first extruder, there is a sudden reduction of the root in the screw conveyor so as to create a substantial pressure and friction resulting in an immediate melting of the particulate material. After melting, the material is discharged from the extrusion so as to limit mixing and/or vortex action. The melt is then introduced into a second extruder having a continuously diminishing pitch conveyor.

The extruders in the present invention are contemplated to generate a minimum vortex action while being self-regulating, so as to maintain a constant output of the plastic melt. Limiting the mixing or vortex produces a measurable separation (layering) of various resins in the melt with the lower density resins (such as olefins) migrating to the outer portions of the melt. This separation or layering action, dependent on the density of the melt, has a substantial advantage in producing articles from a post-consumer plastic mixture.

At the output of the second extruder, a series of fiber rovings are introduced into the melt through a cross-head die. The fiber rovings are used for reinforcing the extruded profile. The rovings are contemplated to be positioned substantially parallel and juxtaposed to the surface of the profile. The rovings not only serve as a reinforcement but compensate for inconsistencies in the melt strength due to the dissimilar resins and the variations in the commingled material. Thereafter, the reinforced profile enters a series of water-chilled calendar/sizing rolls so as to form the desired output shape.

Variations on the individual elements within the combination are contemplated. These variations will be applied to certain applications and certain cross-sectional configurations of the extruded profile.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 9 shows a plan view of an alternate embodiment of a cross-head die portion of the present invention.

FIG. 10 shows a cross-sectional view of the cross-head die portion as taken along line 10—10 in FIG. 9.

DETAILED DESCRIPTION OF THE DRAWINGS

Figure 1:
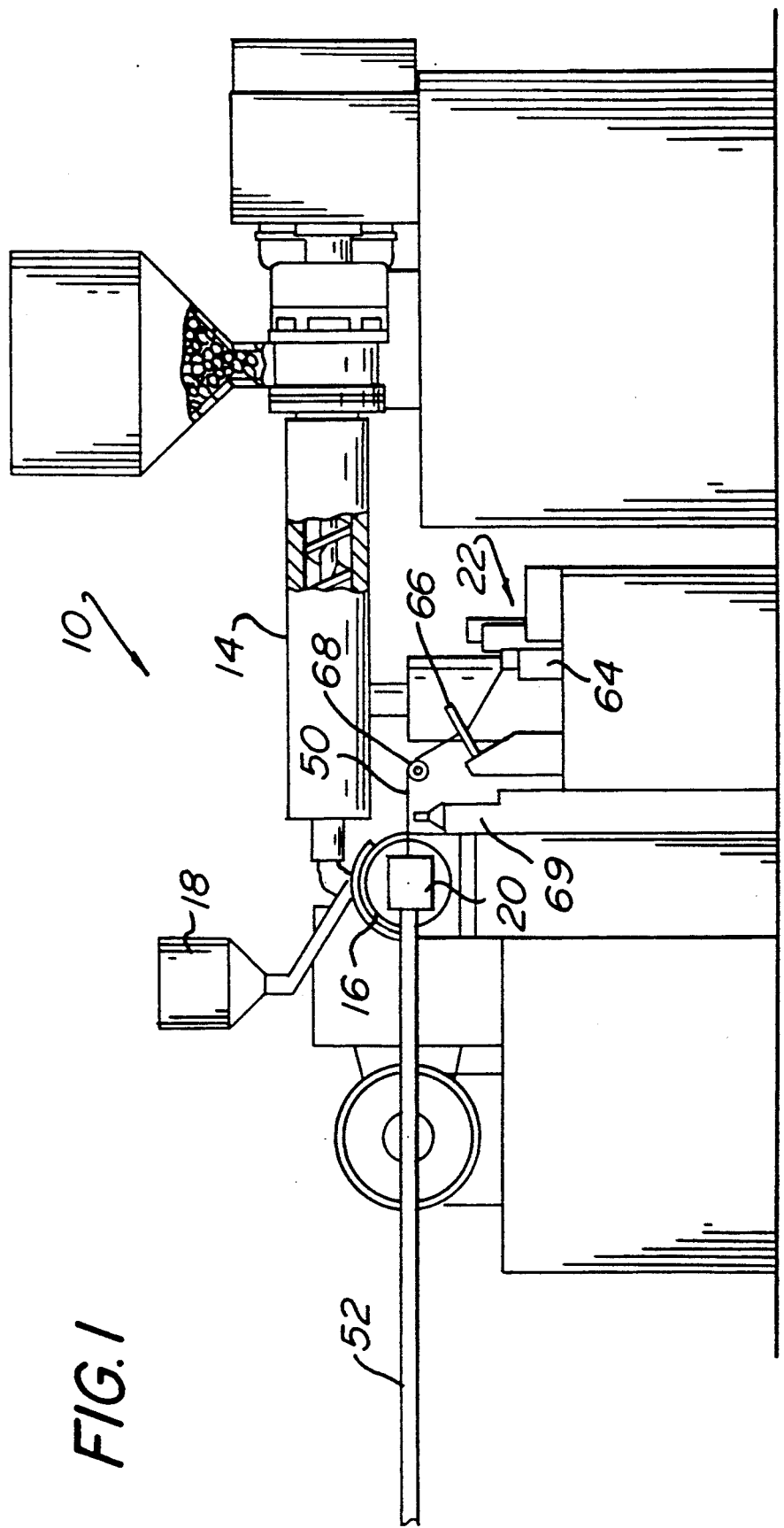
FIG. 1 shows a side view of a portion of the apparatus contemplated by the present invention.
Figure 2:
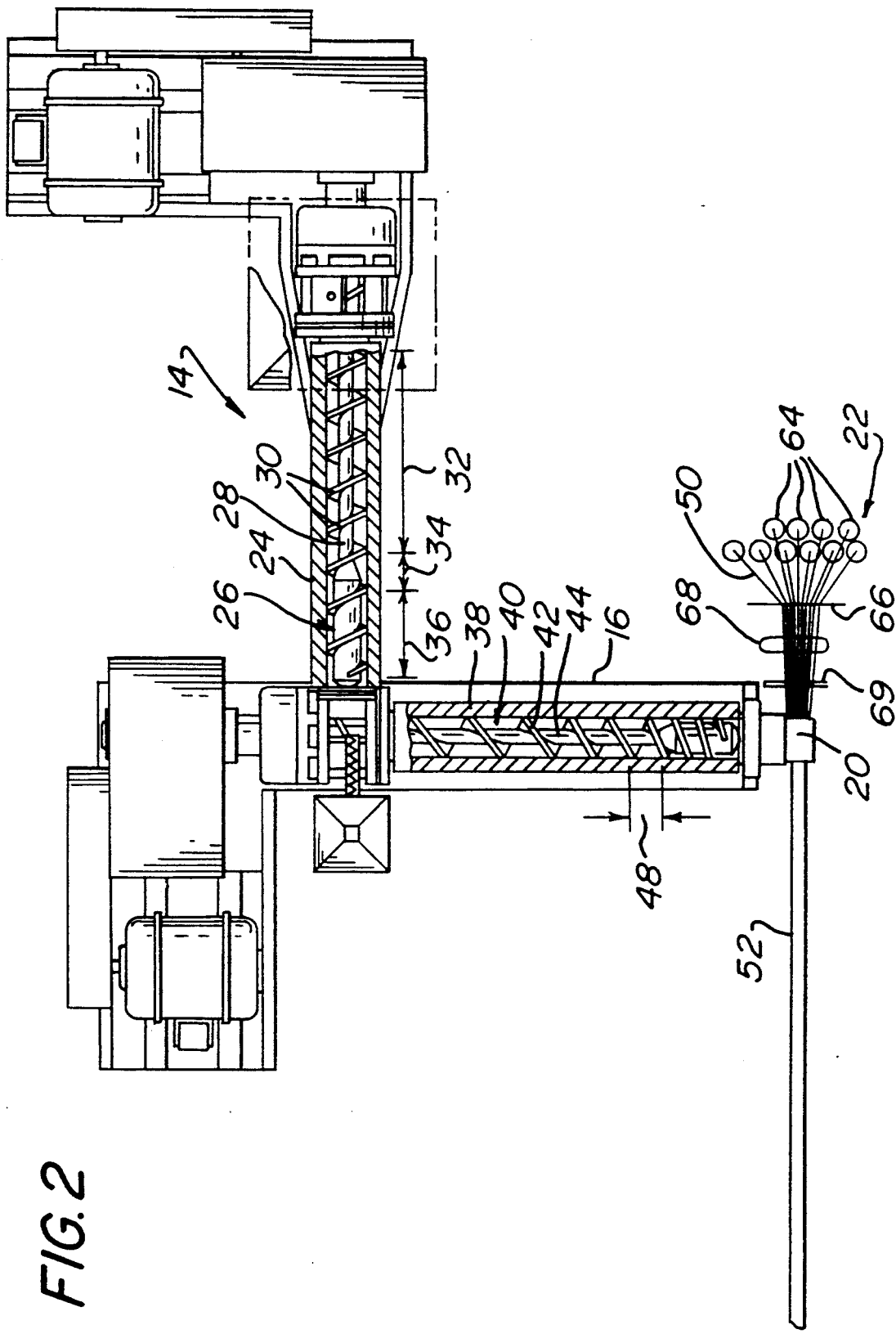
FIG. 2 shows a partial cross-sectional view of the portion of the present invention illustrated in FIG. 1.
Figure 3:
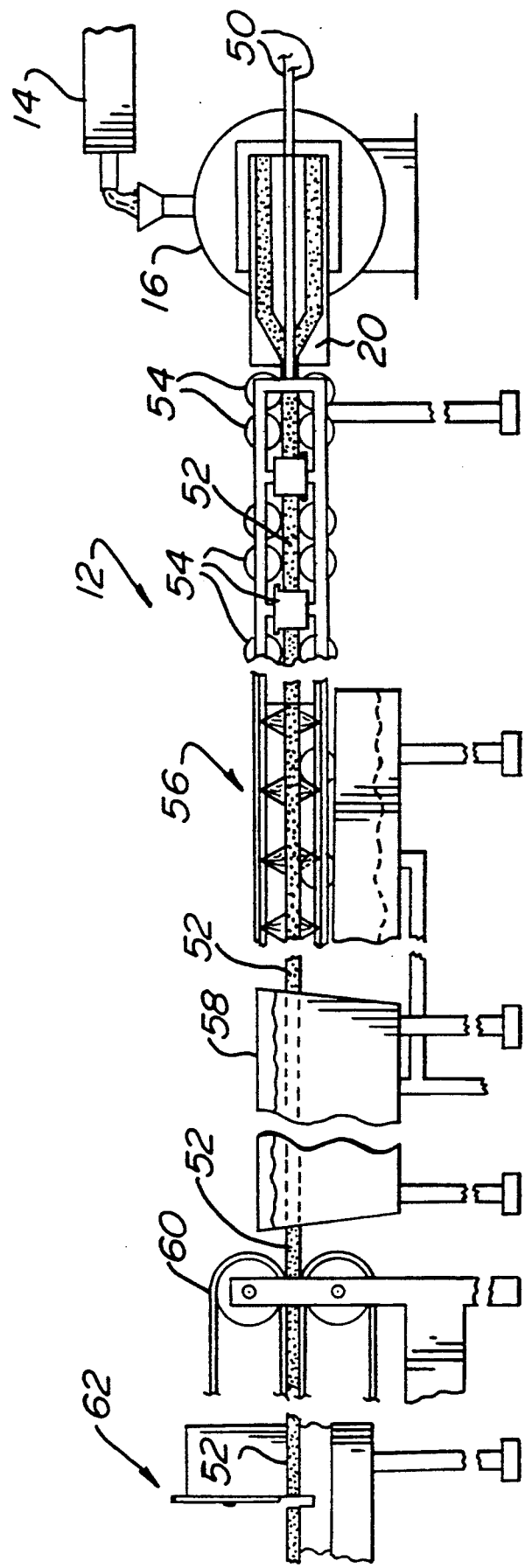
FIG. 3 shows a second portion of the present invention.

In the figures, where like numerals indicate like elements, there is illustrated a preferred embodiment of the present invention. FIGS. 1 and 2 illustrate an extruder portion of the present invention which is generally referred to by the numeral 10. FIG. 3 shows a forming portion of the present invention which is generally referred to by the numeral 12. Detailed description of the extruder portion 10 and the forming portion 12 as contemplated by the present invention, as well as alternate embodiments of certain components thereof, is provided below.

The input plastic material is contemplated to be waste material which has been initially size-reduced via methods common to the art, such as by shredders, granulators, densifiers and the like. The sizing step is contemplated to yield a particulate of which 100% should pass through a ⅜ inch screen. As illustrated in FIGS. 1 and 2, the particulate is then charged into specifically designed extruders so as to be plasticized. The extruder portion 10 generally includes a first extruder element 14 hereinafter referred to as the compound extruder. The compound extruder 14 discharges into a second extruder element 16 which is hereinafter referred to as the hot melt extruder. The particulate material is fed into the compound extruder 14 which conveys and compresses the plastic so as to completely melt the particulate. The flow of melted plastic between the compound extruder 14 and the hot melt extruder 16 is exposed to ambient temperature and pressure. Due to the temperature of the hot melt and the sudden reduction in pressure upon exposure to the ambient air, the volatiles within the melt are removed.

Upon exhaustion from the compound extruder 14, post-melt additions, such as fillers, chemical compatibilizers, colorants, foaming agents, etc., may be metered into the melt via feeder device 18. The metering by feeder device 18 may be made based upon volume or other characteristics. Hollow micro spheres may also be introduced into the melt as a weight reducer for the final product. Particulary, it is contemplated that boron silicon or ceramic hollow micro spheres may be introduced in amounts up to twenty-five percent (25%) by volume. In the form shown in FIGS. 1 and 2 the compound extruder 14 and the hot melt extruder 16 include separate drive means and may be driven at different speeds. It is contemplated that the two conveyors may be formed on a single shaft and driven simultaneously be a single motor. However, the dual motor technique, as illustrated, is preferred since it provides certain flexibility in controlling the flow of plastic and it simplifies the devolitization step.

The hot melt, after passing the feeder device 18, is introduced into the hot melt extruder 16 and extruded through a cross-head type die 20. Prior to the extrusion of the melted plastic from the cross-head die 20, a series of rovings 50 are introduced into the plastic via roving apparatus 22. The rovings 50 serve as reinforcing fibers within the extruded profile and are contemplated to be positioned near the surface.

As particularly illustrated in FIG. 2, compound extruder 14 generally includes a cylindrical barrel 24 having a constant internal diameter and a screw conveyor 26. Screw conveyor 26 generally includes a central shaft 28 having a series of conveyor flights 30 thereon. As illustrated, the flights 30 have a constant feed or pitch. Shaft 28 of the screw conveyor 26 is constant in diameter along the length of the barrel 24 so as to create a feeding section 32 having a constant relatively deep root. The diameter of shaft 28 is increased in a relatively short transition or melting section 34 in which the root of the conveyor 26 is substantially reduced. Finally, a relatively short metering section 36 is provided having a constant shallow root. In the preferred embodiment of the present invention, it is contemplated that the compound extruder 24 will have a length to diameter ratio of 15:1. In the feeding section 32, there will be approximately eleven (11) feed flights 30 each having a constant lead and a constant deep root. The melting section 34 extends for the length of one (1) flight and includes a substantially sharp transition in the root. The metering section 36 generally includes three (3) flights where the root is shallow and constant. The relative dimensions of the roots are presently contemplated to include a six (6) inch outside diameter of the conveyor 26. The root (i.e., the difference between the radius of the flights 30 and the outside diameter of the shaft 28) of the feeding section 32 will be in the range of 0.9 inches. The root of the metering section 36 will be 0.4 inches. The lead of the flights (i.e., the distance between adjacent flights) is contemplated to be in the range of six (6) inches. Variations on these dimensions are possible and thus should not be restricting.

The advantages provided by a compound extruder 14 of the type illustrated in FIG. 2 and as contemplated by the present invention directly relates to the use of commingled plastic particulate as the feed material. The particulate remains in a solid form until it reaches the melting section 34. Because of the sudden and substantial reduction in the root within the melting section 34 and because of the relative length of the feeding section 32, the screw conveyor 26 creates a tremendous pressure (in the neighborhood of 1900 to 2400 PSI) and a substantial friction. Thus, the particulate plastic melts completely within melting section 34 and is then forced in its liquid state immediately into the metering section 36 where it is quickly discharged. Thus, the melted material is exposed to a minimum of mixing or vortex action inside the extruder 14.

The extremely short residence time of the plastic at elevated temperatures limits the possibility of thermal degradation of heat sensitive plastics within the feed, such as PVC. The minimum vortex action in compound extruder 14 inhibits lamination of the dissimilar resins within the melt. Thus, structural integrity can be maintained within the profile of the ultimately extruded material. Moreover, compound extruder 14 generates all of the energy required to melt the plastic particulate via friction and compression and does not require external heating elements.

Hot melt extruder 16 also has a specific form and is illustrated in FIG. 2. Hot melt extruder 16 includes a barrel 38 having a constant internal diameter and a conveyor 40. The hot melt screw conveyor 40 is also contemplated to convey and compress the melted plastic while creating a minimum vortex or mixing. The length to diameter ratio of hot melt extruder 16 is contemplated to be 10:1. Eighty percent (80%) of the conveyor flights 42 are contemplated to include a constant deep root as formed by shaft 44. Approximately five percent (5%) of the flights 42 form a quick transition section 48, with the remainder (15%) having a substantially shallow root for feeding the hot melt into cross-head die 20. Throughout the entire length of the hot melt extruder 16, the lead of the screw conveyor 40 consistently decreases. This type of screw conveyor 40 conveys and compresses the melted plastic while generating a minimum of vortex. Moreover, the reduction in lead results in a self-regulating function, such that hot melt extruder 16 may be starve fed by the compound extruder 14 and still maintain a constant output of plastic melt. The presently contemplated dimensions of the hot melt extruder 16 include a six (6) inch outside diameter for the conveyor flights 42, a deep root in the inlet section in the range of 1.25 inches, a shallow root in the outlet (metering) section of 0.45 inches and a single lead transition section 48. The lead of the hot melt extruder 16 in the inlet section is contemplated to be approximately nine (9) inches and approximately four (4) inches at the outlet. The lead will gradually and constantly decrease between these two positions along its length.

The hot melt extruder 16 of the type presently contemplated permits venting of volatiles back through the throat section adjacent to the feeder device 18. Moreover, extruder 16 produces a measurable separation or layering of various resins of the melt with the lower density resins (such as olefins) migrating to the outer portions of the melt. This unexpected and extremely advantageous function is important, since most post-consumer plastic waste materials are comprised primarily of olefin-type plastics. The layering of the resins in the final extruded profile ultimately results in a substantially strong product without flaws within its structure.

As generally illustrated in FIG. 2, a series of fiber rovings 50 are introduced into the profile of the extruded product 52 by the interaction between crosshead die 20 and roving apparatus 22. These rovings 50 are contemplated to be made of a continuous inorganic fiber material including, but not limited to, silicone, carbon, fiberglass and metallic-type fibers. Presently, Owens Corning type 30 fiberglass roven is preferred. The fibers are contemplated to be positioned approximately 0.020 inches beneath the surface of the extruded product 52. As will be generally described with reference to the figures below, it is contemplated that the placement of reinforcing fibers both near the surface of the extruded profile and the orientation of those fibers along the proper axes or surfaces will result in a strong product having the desired characteristics for commercial use.

FIG. 3 graphically illustrates a forming portion 12 for the extruded product as contemplated by the present invention. The forming portion 12 is positioned at the discharge end of the extruding portion 10 and receives the extruded plastic from the cross-head die 20 positioned at the outlet of hot melt extruder 16. Most profile extrusions, depending on the polymer, are stretched or have a draw-down ratio of 2:1 to 10:1. These profiles are generally allowed to air cool or are plunged immediately into a water quenching tank. However, in the presently contemplated invention, the poor melt characteristics of commingled plastics limits draw-down to 10% to 20%. Also in the present invention, the thickness of the profile and the introduction of reinforcing fibers make it necessary to cool the extruded product 52 slowly so as to avoid stresses and voids.

At the start of forming portion 12, the extruded product 52 exits the cross-head die 20 and enters a series of water-chilled calendaring/sizing rolls 54. These sizing rolls 54 slowly cool the skin of the extruded profile 52 while slightly compressing the profile to eliminate internal voids. After exiting the sizing rolls 54, the product 52 passes through a misting chamber 56 having a series of atomizing heads which spray a fine mist of water onto the product 52. After passing through the misting chamber 56, the product 52 enters a quenching tank 58 for final cooling. Throughout the forming portion 12, the extruded product 52 is pulled by a belt-type catapuller 60. A constant tension is kept on the fiber rovings 50 within the formation of the extruded product 52 so as to maintain proper orientation of the fibers within profile. Moreover, the constant tension on the rovings 50 prevents the product 52 from being overstretched in one particular area due to variations in the melt strength of the plastic. This variation in melt strength could be a significant problem due to the fact that commingled resins are being utilized. Variations in the quantity or quality of the resins will determine a different melt strength in the extruded profile at different portions thereof which, without the rovings, could cause uneven stretching. Thus, the rovings serve to maintain a constant tension and a constant pull through the forming portion 12 and constant cross-sectional dimensions. After exiting the catapuller 60, the extruded product 52 may enter a transverse saw or the like 62 where it is cut into desired lengths.

Figure 4:
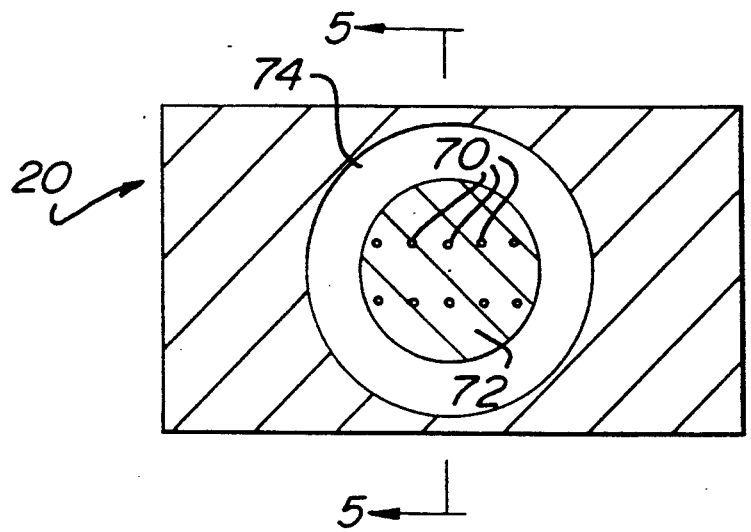
FIG. 4 shows a cross-sectional view of a cross-head die portion of the present invention.
Figure 5:
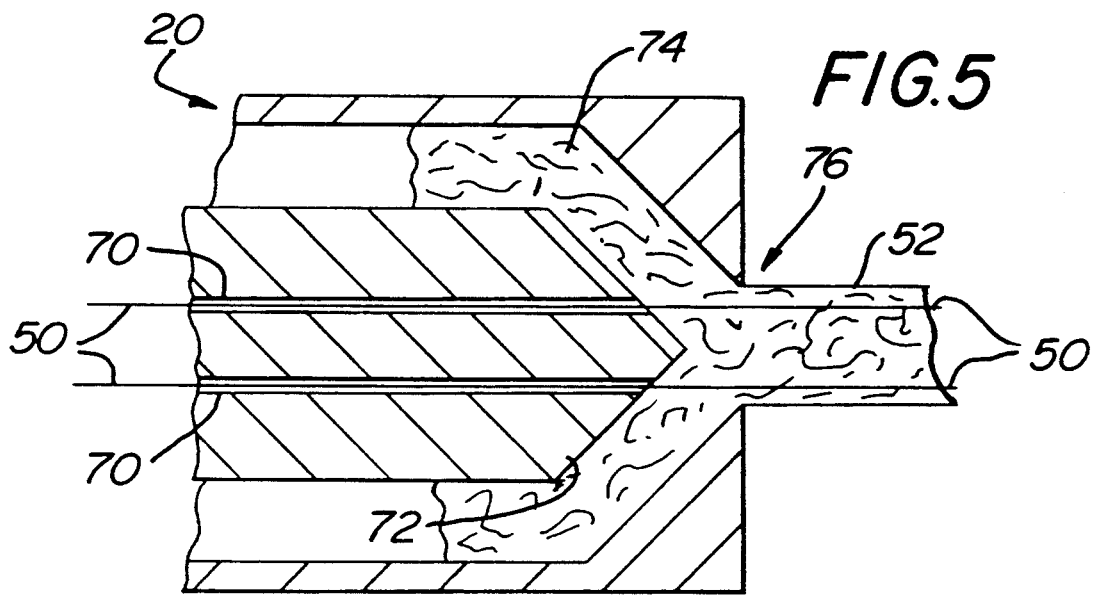
FIG. 5 shows a second cross-sectional view of the cross-head die as taken along line 5—5 in FIG. 4.

Referring back to FIG. 2 and referring to FIGS. 4 and 5, the introduction of the fiber rovings 50 into the extruded profile 52 via the cross-head die 20 is illustrated. The fibers 50 are of a continuous nature in the form of a roving or pressed ribbon. Depending on the type of fiber used, spools 64 are placed on spindles (not shown) for outside takeoff or on revolving turntables (see FIG. 8) if the rovings are to be taken off from the inside of the spools. The rovings 50 pass through a loom and pre-tensioner 66. The pre-tensioner may be any type as desired. Presently, the structure (not shown) is contemplated to include two resiliently mounted wheels that contact the roving thread on opposite sides. Tension is created by the frictional contact of the wheels. It is also contemplated that this pretension may be adjustable. The rovings 50 are then wrapped around a brake-control tension roll 68 which provides equal tension on all of the roving bundles as they are introduced into the extruded profile 52. The rovings are contemplated to be wrapped around the tension roll 68 which is rotated by the feed of the rovings. A pneumatic brake (not shown) or the like is brought into contact with the roll to control the tension. The rovings 50 also pass through air jet separator 69 to disperse the individual fibers from the roving bundle. The loose fiber bundles are then fed through the rear of the cross-head die 20 through openings 70.

The openings 70 within cross-head die 20 are in the form of tubes which extend through a mandrel 72. The rovings 50 enter tubes 70 and exit the mandrel 72 inside of the die 20 and continue through the melted plastic. The rovings 50 are placed precisely on the desired surface of the extruded profile 52 at the desired distance from the surface. As is illustrated in FIG. 4, the crosshead die forms a channel 74 that circles or surrounds the mandrel 72 with melted plastic. The hot melt is then tapered around the front portion of mandrel 72 and extruded through opening orifice 76.

Again, the fiber rovings are introduced into the product 52 because the feed consists of a commingled polymer mix. The fibers not only serve as reinforcement for the product in its solidified form but also as a carrier or support system for the extruded plastic as it is cooled. The commingled blend of dissimilar resins result in inconsistencies in the melt strength. The rovings compensate for these inconsistencies. It is contemplated that a chemical bond will be formed between the polymer matrix of the extruded product 52 and the reinforcing fiber rovings 50. To achieve this bond, special coupling agents, such as, but not limited to, silanes, titanium zirconate or mythacrylate, are dispersed into the polymer matrix and are used as a surface treatment on the reinforcing fibers 50.

Figure 6:
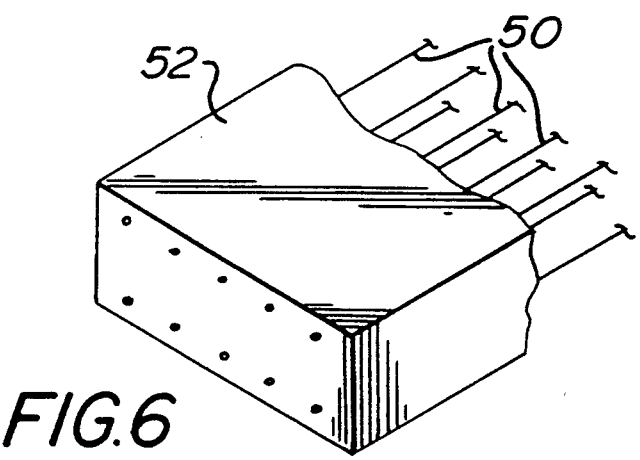
FIG. 6 shows a cross-sectional view of a board product as produced by the present invention.
Figure 7A:
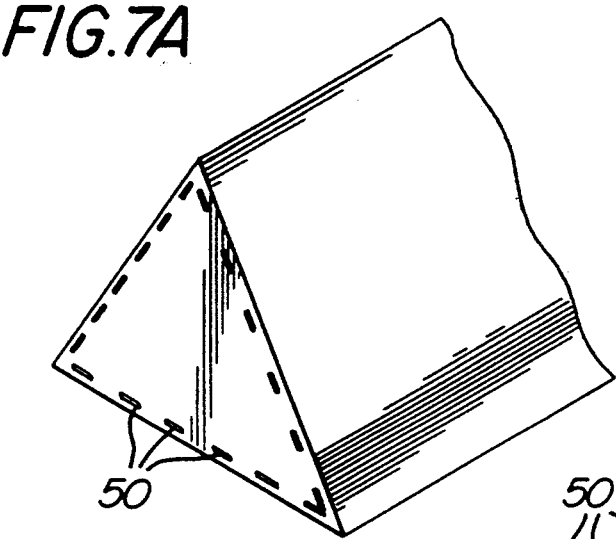
FIGS. 7A, 7B, 7C and 7D show various alternate embodiments of an extruded profile produced by the present invention.
Figure 7B:
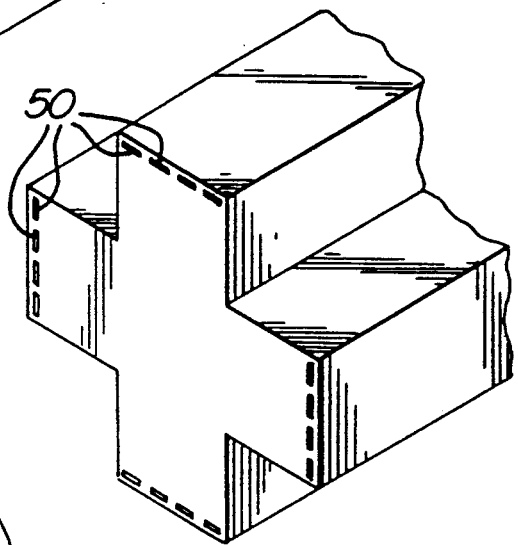
Figure 7C:
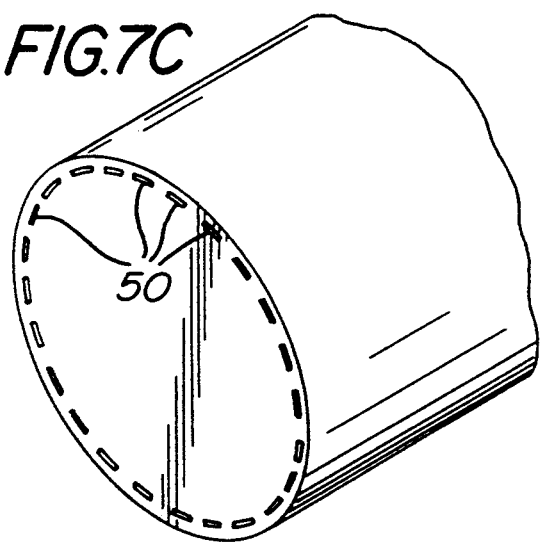
Figure 7D:
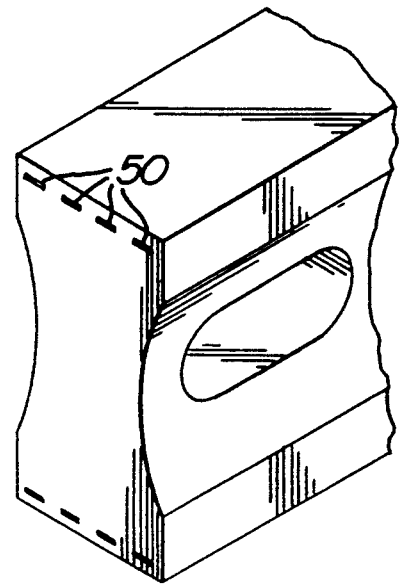

Illustrated in FIG. 6 is a cross-sectional configuration of an extruded profile 52 including a series of fiber rovings 50 as produced through the cross-head die 20. FIGS. 7A-7D illustrate a series of alternate cross-sections. In each of these cross-sections, the fibers are positioned approximately 0.020 inches beneath the surface of the extruded profile. In FIG. 6, a generally-rectangular cross-section is illustrated with ten (10) fiber rovings 50 positioned adjacent to the upper and lower surfaces of the longer face of the profile 52. In FIG. 7A, the cross-section is generally contemplated to be triangular with the fiber rovings introduced on each surface of the cross-section. FIG. 7B shows a cross-shaped profile with the fiber rovings introduced adjacent to the projected extensions for each of the cross members. FIG. 7C shows a circular profile with the fiber rovings adjacent to the circumference. In FIG. 7D there is illustrated a generally I-shaped beam wherein the fiber rovings are positioned adjacent to the upper and lower webs of the profile.

Figure 8:
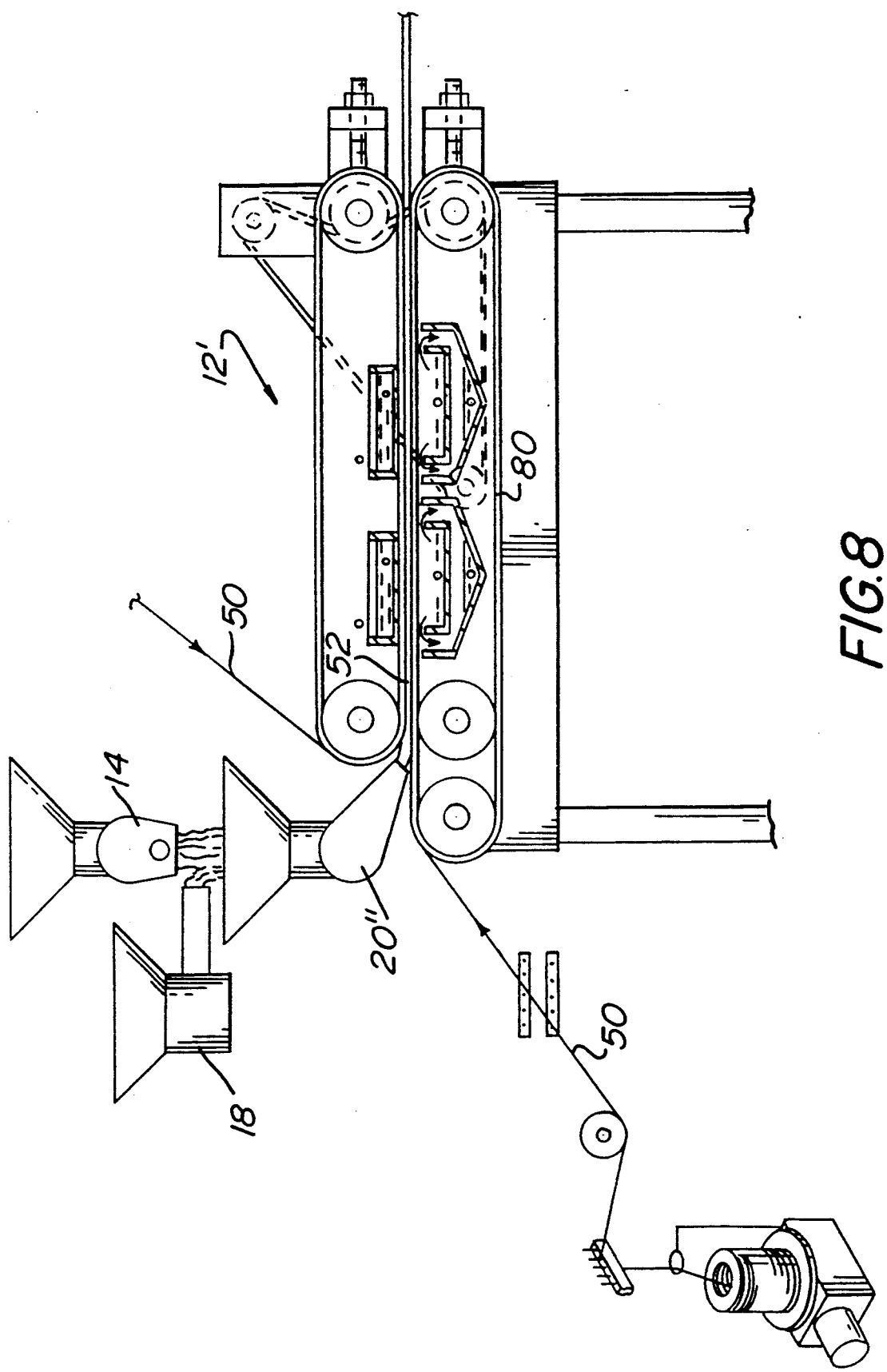
FIG. 8 shows a diagrammatic view of an alternate embodiment of a portion of the present invention.

In FIG. 8, a diagrammatic view of an alternate embodiment of the forming portion 12' of present invention is illustrated. In this alternate embodiment, the fiber rovings 50 are introduced into the extruded profile 52 by means of a belt conveyor system 80 positioned adjacent to the cross-head die 20". The conveyor belt system 80 includes a cooling means within its center so as to properly cool and solidify the extruded profile 52. It is contemplated that the belts of the conveyor 80 will compress the fiber rovings 50 into the product 52 after it is extruded through cross-head die 20".

In FIGS. 9 and 10, there is illustrated an alternate embodiment of the cross-head die 20'. This alternate cross-head die 20' is in the form that is presently preferred. In this embodiment, the fiber rovings 50 are introduced through a series of adjustable spreader and guide bars 82. Guide bars 82 are fixed on opposite sides of the die portion 84 on shafts 86. The rovings 50 pass over the shaft 86 and are separated by a series of bushings 88. The rovings 50 are then directed over a spacer bar 90 and into an adjustable mandrel 92. Adjustable mandrels 92 are mounted to the outside of the output portion 94 of the cross-head die 20'. Within the output portion 94 are a series of passageways 70' which connect with tubing 96 that projects into the outlet opening 76' within the output portion 94. Die portion 84 is connected to the outlet of the hot melt extruder 16. The melted plastic is directed through the die portion 84 and turned 90° towards the exhaust opening 76'. The channel 98 within the cross-head die 20' is illustrated in FIG. 10 as being tapered from the die portion 84 toward the output portion 94. As the channel approaches the exhaust opening 76', the cross-sectional dimensions become more uniform and form the general configuration of the product 52 as it is to be extruded through the opening 76'. However, adjacent to the tubing 96 which projects into channel 98, there is provided a relief opening 100 that encircles the projection of the tubing 96. This relief opening permits the melted plastic to surround the tubing 96 and the roving 50 as it is introduced into the extruded product 52. The direction of the rovings 50 as they are introduced into the melted plastic within channel 98 is illustrated to be approximately 30°. However, it is contemplated that angles may be varied depending upon the nature of the roving and the flow rate of the melted plastic. Specifically, it is contemplated that a shallower angle with respect to the axis of the channel 98 will be utilized. This alternate embodiment of the cross-head die 20' eliminates the need for a mandrel such as item 72 in FIGS. 4 and 5. It is further contemplated that the elimination of the mandrel and the directing of the melted plastic through channel 98 will create less turbulence and/or mixing in extruding the product and the introduction of fiber rovings 50 as compared to the other embodiment disclosed herein.

The present invention may be embodied in other specific forms without departing from the spirit or essential attributes thereof and, accordingly, reference should be made to the appended claims, rather than to the foregoing specification, as indicating the scope of the invention.

I claim:

1. An apparatus for producing an extruded product comprising:

first extruder means having an inlet for receipt of a plastic waste particulate, an outlet for exhausting a melted plastic, and a first conveyor rotating within the bore of the first extruder means;

second extruder means having an inlet for receipt of a melted plastic, an outlet for exhausting a melted plastic, and a second conveyor, the second extruder means inlet positioned to receive the plastic melt from the outlet of the first extrusion means;

cross-head die means for extruding melted plastic from the outlet of the second extruder means, the cross-head die means forming the melted plastic in the desired product cross-section;

means for introducing fiber rovings into the extruding melted plastic, the fiber introduction means cooperating with the cross-head die means so as to introduce the fiber rovings during extrusion and positioning the rovings parallel and juxtaposed to the surface of the extruded product; and cooling means for forming and cooling the profile of the extruded product upon extrusion from the cross-head die means, the cooling means pulling the extruded profile along its length while tensioning the fiber rovings within the melted plastic.

2. The apparatus of claim 1 wherein the first extruder means further comprises:

a feed section of the conveyor having a deep root that extends for at least 50 percent of the overall length of the first extruder means between the inlet and the outlet, a metering section having a shallow root and positioned adjacent the outlet end of the first extruder means, and a melting section between the feeding section and the metering section, the melting section including a progressive enlargement of the root from that of the feed section to that of the metering section, the length of the melting section being approximately one lead of the conveyor.

3. The apparatus of claim 2 wherein the outlet of the first extruder means exposes the melted plastic to ambient conditions so as to devolitize and depressurize the melt.

4. The apparatus of claim 3 wherein the fiber introduction means further comprises guide bars fixed on opposite sides of the cross-head die means, the rovings passing over the guide bars and into a channel for melted plastic within the cross-head die, and insert tubes positioned on the cross-head die for directing the rovings into the flow of plastic within the channel so as to be extruded along with the plastic.

5. An apparatus for forming an extruded product comprising: an extruding portion having a first extruder and a second extruder, and a forming portion located at the discharge end of the extruding portion, the first extruder adapted to receive a particulate plastic feed stock material and to melt the plastic particulate, the second extruder adapted for receipt of the melted plastic from the first extruder, for compressing and conveying the melted plastic and for extruding the plastic into the forming means, the first extruder comprising an inlet for receipt of the plastic particulate, an outlet for exhausting the melted plastic, a constant bore, and a first conveyor rotating within the bore, the first conveyor having a constant lead, and including a feed section, a melting section and a metering section, the feed section having a deep root that extends for at least fifty percent (50%) of the overall length between the inlet and the outlet, the metering section having a shallow root, and the melting section having a progressive enlargement of the root from that of the feed section to that of the metering section, the length of the melting section being approximately one lead of the conveyor, the second extruder comprising an inlet for receipt of the melted plastic from the outlet of the first extruder, an outlet for exhausting the melted plastic, a constant bore, and a second conveyor, the second conveyor including a progressively decreasing lead along its entire length, the first and second extruder adapted to limit the mixing and vortex of the melted plastic during the extrusion process.

6. The apparatus of claim 5 wherein the second conveyor of the second extruder includes a transition portion wherein the root increases toward the outlet of the second extruder, the transition portion extending for approximately one lead of the conveyor, and a metering portion between the transition portion and the outlet of the second extruder, the root of the metering portion of the second conveyor being shallow.

7. The apparatus of claim 6 further comprising means for introducing fiber rovings into the melted plastic discharged into the forming portion, the fiber introduction means positioning the rovings parallel and juxtaposed to at least one surface of the extruded product, the forming portion cooling the profile of the extruded plastic discharged from the second extruder and pulling the profile of the plastic while tensioning the fiber rovings within the melted plastic.

8. The apparatus of claim 7 further comprising cross-head die means for extruding melted plastic from the outlet of the second extruder into the forming means, the cross-head die means forming the melted plastic in the desired product cross-section and the fiber introduction means cooperating with the cross-head die means so as to introduce the fiber rovings during extrusion and position the rovings parallel to the surface of the extruded product.

9. A method of making a thin profile extruded product from a commingled plastic waste feed stock, comprising the steps of:

feeding a particulate commingled plastic waste feed stock;

extruding the particulate through a first extruder and melting the particulate by compaction and compression within the first extruder;

extruding the particulate substantially without mixing or vortexing the melted plastic through a second extruder, the melted plastic substantially separating within the second extruder by resin type;

extruding the melted plastic extruded within the second extruder through a die to form a thin profile cross-section;

introducing fiber rovings into the profile of the plastic melt extruding through the die;

pulling the extruded plastic profile from the die by tensioning the fiber rovings within the profile; and cooling the extruded and pulled plastic profile.

10. The method of claim 9 wherein the fiber rovings are introduced parallel to at least two opposing surfaces of the extruded profile, juxtaposed to the surfaces.

11. The method of claim 10 wherein the fiber rovings are positioned approximately 0.020 inches from the surfaces of the extruded profile.

12. An apparatus for forming an extruded product from a mixed, contaminated, post-consumer and/or industrial plastic waste, the apparatus comprising: an extruding portion having a first extruder and a second extruder, and a forming portion located at the discharge end of the extruding portion, the first extruder adapted to receive a particulate plastic feed stock material and to melt the plastic particulate, the second extruder adapted for receipt of the melted plastic from the first extruder, for compressing and conveying the melted plastic and for extruding the plastic into the forming means, the first extruder comprising an inlet for receipt of the plastic waste particulate, an outlet for exhausting the melted plastic, a constant bore, and a first conveyor rotating within the bore, the first conveyor having a constant lead, and including a feeding section for feeding the feed stock material, a melting section for melting the feed stock material and a metering section for metering the melted feed stock material, the feed section having a deep root that extends for at least fifty percent (50%) of the overall length between the inlet and the outlet, the metering section having a shallow root, and the melting section having a progressive enlargement of the root from that of the feed section to that of the metering section, the length of the melting section being approximately one lead of the conveyor, the second extruder comprising an inlet for receipt of the melted plastic from the outlet of the first extruder, an outlet for exhausting the melted plastic, a constant bore, and a second conveyor, the second conveyor including a progressively decreasing lead along its entire length, the first and second extruder adapted to limit the mixing and vortex of the melted plastic during the extrusion process.

13. The apparatus of claim 12 wherein the second conveyor includes a substantially constant root along its length.

14. The apparatus of claim 12 wherein the outlet of the first extruder is positioned adjacent the inlet for the second extruder such that the flow of melted plastic between the first and second extruders is exposed to ambient pressure.

15. The apparatus of claim 14 wherein the second conveyor includes a constant root along substantially its entire length.

16. The apparatus of claim 15 wherein the constant root extends for at least eighty percent (80%) of the length of the second conveyor.

17. The apparatus of claim 15 wherein the first and second extruders are each driven by separate drive means each capable of rotating the first and second conveyors at different speeds.

18. The apparatus of claim 15 wherein the first and second extruders are each unvented along substantially their entire length.

19. The apparatus of claim 12 further comprising means for introducing fiber rovings into the extruded profile of the melted plastic, the fiber introduction means positioning the rovings parallel and juxtaposed to at least one surface of the extruded product.

20. The apparatus of claim 19 wherein the fiber roving introduction means introduces the fiber rovings at a position approximately 0.020 inches from the surfaces of the extruded profile of the product.

21. A method of making a thin profile extruded product from a commingled plastic waste feed stock, comprising the steps of: feeding a particulate commingled plastic waste feed stock; extruding the particulate through a first extruder and melting the particulate by compaction and compression within the first extruder; extruding the particulate substantially without mixing or vortexing the melted plastic through a second extruder, the melted plastic substantially separating within the second extruder by resin type, extruding the melted plastic extruded within the second extruder through a die to form a thin profile cross-section; introducing fiber rovings into the profile of the extruded plastic melt.

22. The method of claim 21 wherein the first rovings are introduced parallel to at least two opposing surfaces of the extruded profile, juxtaposed to the surfaces.

23. The method of claim 22 wherein the fiber rovings are positioned approximately 0.020 inches from the surfaces of the extruded profile.

* * * * *